US008938583B1

(12) United States Patent
Suryabudi

(10) Patent No.: US 8,938,583 B1
(45) Date of Patent: Jan. 20, 2015

(54) SYSTEM AND METHOD FOR CONCURRENTLY EXECUTING DATA ACCESS REQUESTS

(75) Inventor: Dominic S. Suryabudi, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1 day.

(21) Appl. No.: 13/298,272

(22) Filed: Nov. 16, 2011

(51) Int. Cl.
*G06F 12/00* (2006.01)

(52) U.S. Cl.
USPC .......................... 711/114; 711/157; 711/170

(58) Field of Classification Search
USPC .......................... 711/114, 157, 170
See application file for complete search history.

(56) References Cited

U.S. PATENT DOCUMENTS

| 6,233,648 | B1 * | 5/2001 | Tomita .............................. 711/4 |
| 7,979,633 | B2 * | 7/2011 | Kleiman et al. ............. 711/114 |
| 2003/0120864 | A1 * | 6/2003 | Lee et al. ...................... 711/114 |
| 2005/0149678 | A1 * | 7/2005 | Stolowitz ...................... 711/114 |
| 2009/0172261 | A1 * | 7/2009 | Prins et al. .................... 711/103 |
| 2010/0058003 | A1 | 3/2010 | Goto et al. |
| 2011/0069526 | A1 | 3/2011 | Schuette |
| 2011/0072187 | A1 | 3/2011 | Forhan et al. |
| 2012/0221767 | A1 * | 8/2012 | Post et al. ..................... 711/103 |

OTHER PUBLICATIONS

Yang et al, Performance Impact and Interplay of SSD Parallelism through Advanced Commands, Allocation Strategy and Data Granularity, Jun. 4, 2011, pp. 96-107.*

* cited by examiner

*Primary Examiner* — Gurtej Bansal

(57) ABSTRACT

Embodiments of the invention are directed to systems and methods for optimizing data access request handling in a non-volatile memory (NVM) device. In one embodiment, the device may include a number of storage elements that can be concurrently programmed, and the device may include a controller that determines whether data access requests may be staged and processed together so that the concurrency of the storage device may be optimized. In one embodiment, staged requests are selectively combined together so that their combined data size is greater than or equal to a data size that can be programmed in a single set of concurrent operations to the storage elements.

22 Claims, 4 Drawing Sheets

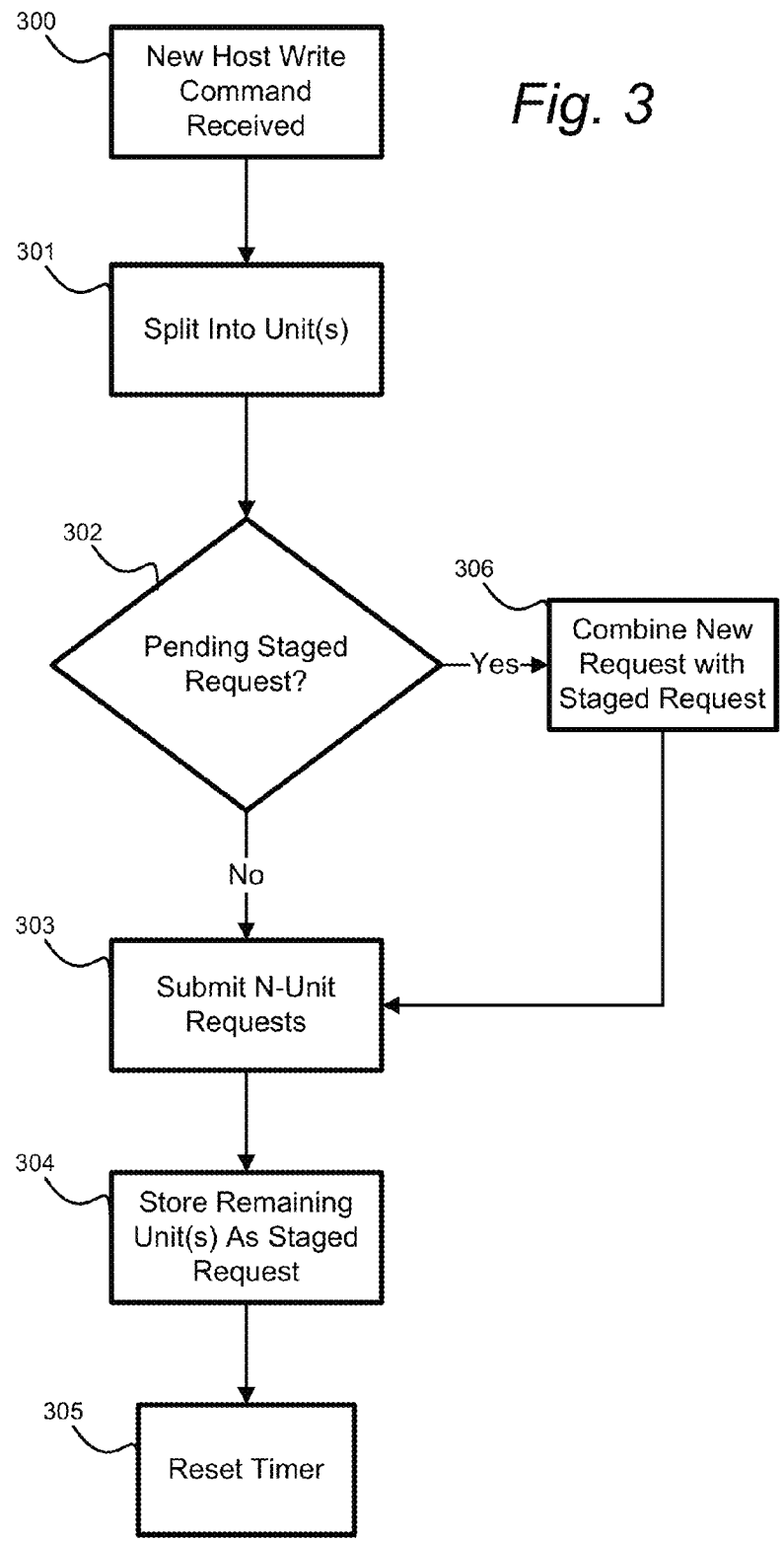

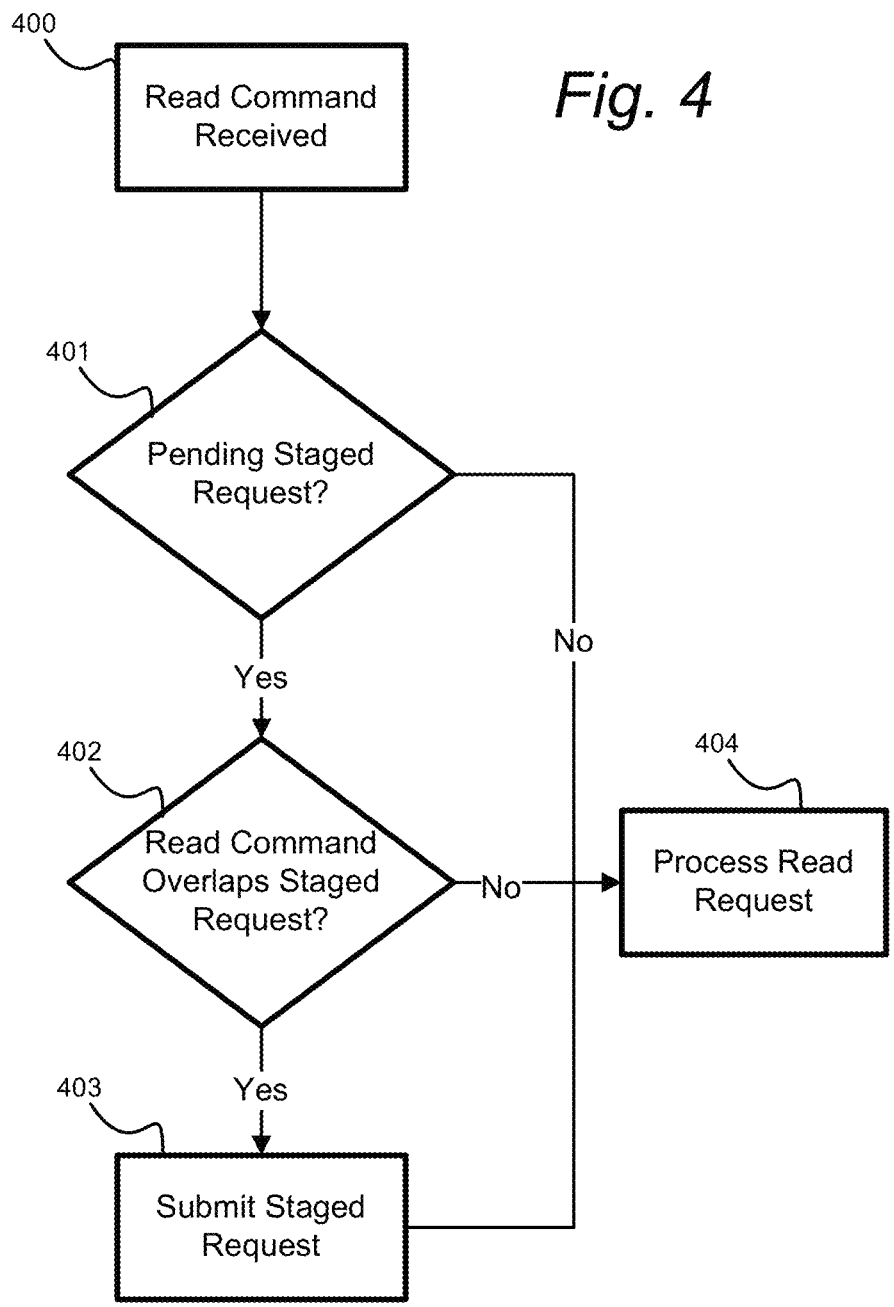

SYSTEM AND METHOD FOR CONCURRENTLY EXECUTING DATA ACCESS REQUESTS

BACKGROUND

1. Technical Field

This disclosure relates to managing data access requests in a non-volatile memory (NVM) device.

2. Description of Related Art

The performance of NVM systems such as solid-state semiconductor memory storage devices often depends on the efficiency of data access request handling. In many applications, a NVM system may process data access requests from a host computing device and those requests may be of various sizes. There may be instances where the data sizes of those host requests do not align with the internal sizes of the storage elements within NVM system.

BRIEF DESCRIPTION OF THE DRAWINGS

Systems and methods which embody the various features of the invention will now be described with reference to the following drawings, in which:

FIG. 3 illustrates write command processing according to an embodiment.

FIG. 4 illustrates read command processing according to an embodiment.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for optimizing data access request handling in a NVM device. In one embodiment, the device may include a number of storage elements that can be concurrently programmed, and the device may include a controller that determines whether data access requests may be staged and processed together so that the concurrency of the storage device may be optimized. In one embodiment, staged requests are selectively combined together so that their combined data size is greater than or equal to a data size that can be programmed in a single set of concurrent operations to the storage elements.

As used in this application, "non-volatile memory" (NVM) typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

System Overview

Figure 1:
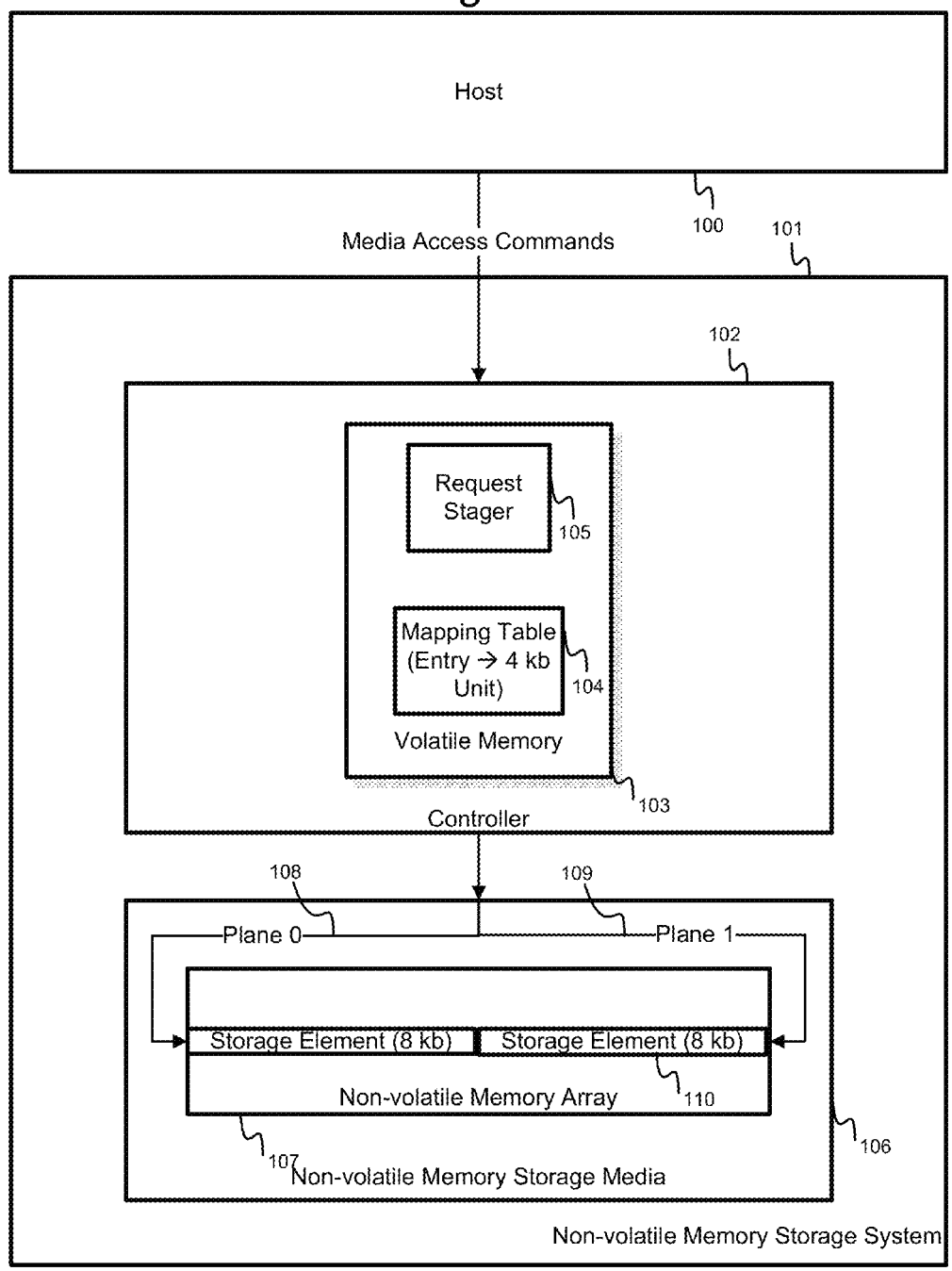
FIG. 1 illustrates an embodiment of a NVM device.

Referring to FIG. 1, an embodiment of a NVM device 101 is shown in communication with a host device 100. The host device 100 can send media access commands through a variety of interfaces (not shown) to the NVM device 101. The NVM device 101 typically includes a controller 102 and non-volatile memory storage media 106, which may include one or more NAND array, for example. The controller 102 may receive the media access commands from the host device 100, control memory accesses to the NVM media 106, and maintain a variety of processes to control accesses to the NVM media 106. The controller 102 may include volatile memory 103 (e.g., DRAM), which may be used to store a mapping table 104 and/or a request stager 105.

In one embodiment, the mapping table 104 maintains a logical-to-physical mapping of memory addresses. The logical address is typically the address range used by the host, which is mapped to a physical address on the NVM device. In the example embodiment shown in FIG. 1, the entries of the mapping table 104 map to 4 kb portions of addressable memory, referred to as "data units." That is, each entry in the mapping table refers to 4 kb of addressable space in the non-volatile memory storage media 106. The request stager 105 may hold or "stage" a previous group of data units that has not been submitted to the NVM array 107. The request stager 105 may combine staged data units with data units from a new command. This aspect is further described with reference to FIG. 2.

In one embodiment, the controller 102 receives media access commands from the host and may divide data associated with the media access commands into data units according to the size of data referenced by the individual mapping table entries, though in other embodiments other sizes may be used. These data units can then be written to the NVM array 107. The NVM array 107 may be accessible by a plurality of access points. In this embodiment, a die of the NVM array 107 is accessible by two planes, plane 0 and plane 1, with reference numbers 108 and 109 accordingly. The planes enable concurrent memory accesses to the NVM array, and each plane may allow writes to individual storage elements 110. In this example embodiment, the storage elements 110 represent the smallest programmable element size of the NVM array, such as a page. Each storage element may or may not correspond to the size of the mapping table data units referenced by entries in the mapping table 104. As an example, in this embodiment the storage elements can each store 8 kb of data while each of the mapping table entries refers to 4 kb of data. As such, each storage element can be referred to by two entries in the mapping table (8 kb/4 kb). In other embodiments, different combinations of mapping table entry and storage element sizes are possible. For example, in certain embodiments, a NVM array may have multiple channels and multiple dies with each channel providing access to two or more planes on a memory die. In that case, the number of access points that can be concurrently used can be significantly higher than two.

In this example, since each plane can allow a write to a storage element and each storage element can include data referenced by two mapping table entries, data referenced by a total of four mapping table entries can be written to the NVM array 107 concurrently. Since media access commands received by the controller 102 may specify a variety of sizes of data to write, these commands may or may not correspond to portions which would fully occupy the storage elements 110.

For example, if a media access command specifies 12 kb of write data, the controller would need to write three 4-kb data units to the NVM array 107. Since the example array can support simultaneous programming of up to four 4-kb data units at a time (two data units per storage element and two storage elements per plane), a portion of the write capacity is wasted and may be written with no valid user data. A method is provided to improve the write concurrency of the NVM array 107. By optimizing the number of write data units sent in each program request to the NVM array 107, concurrency can be improved while reducing any excess garbage collection and write amplification. As such, this method improves utilization of the storage elements 110 and plane 0 (108) and plane 1 (109) by attempting to ensure a maximum number of write data units are programmed at the same time.

Grouping Write Data Units

Figure 2:
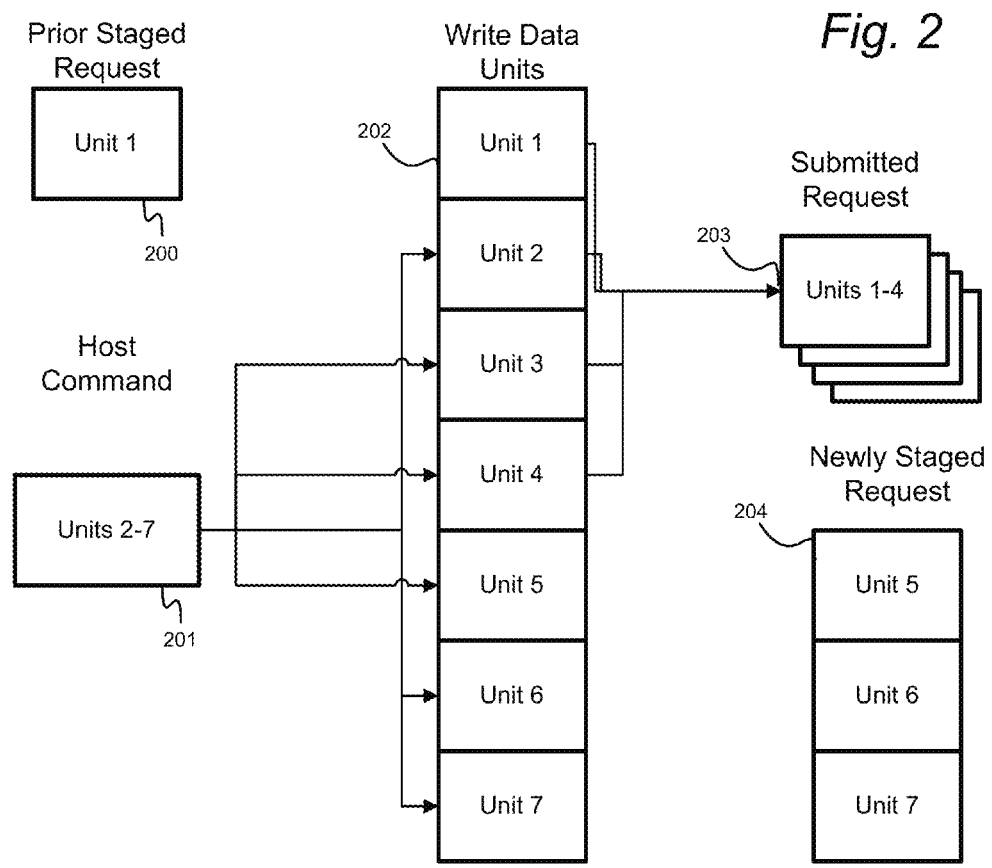
FIG. 2 illustrates request staging and grouping data units according to an embodiment.

Referring to FIG. 2, an illustration is provided for an embodiment of a process for submitting write requests to the NVM array. This process can be performed, for example, by the controller 102 in FIG. 1. At block 200, data unit 1 is associated with a prior staged request, which may remain in a temporary buffer (e.g., request stager 105) from a previous write command. When a new write command is received at block 201, the write data may be divided into data units according to the size of the data referenced by the entries in the mapping table. One or more of these data units can then be grouped with one or more data units associated with a prior staged request, illustrated as block 202.

In this example system, a maximum of four data units can be programmed simultaneously. As such, the submitted request 203 includes the first four data units of the group. The remainder, data units 5-7 illustrated as 204, can be stored in the request stager 105 for use with a subsequent write command. For example, if another command with one data unit's worth of data arrives later, data units 5-7 can be combined with the one data unit and submitted as a single request to the array for programming.

Host Write Command Processing

Referring now to FIG. 3, a method for processing write commands according to an embodiment is shown. This process can be performed, for example, by the controller 102 in FIG. 1. At block 300, a new host write command is received. At block 301, the host write command is analyzed to determine the number of data units of data the command constitutes and data associated with the command is split into data units. At block 302, the controller determines whether there is a pending staged request. If so, the new incoming request data units can be combined with the staged request data units at block 306.

At block 303, requests can be submitted to the NVM array by grouping the data units together. Preferably, the maximum number of data units ("N") that can be concurrently written in a single request is grouped together to form a write request. In one embodiment, N is calculated as follows:

N=the number of access points that can be accessed simultaneously X the number of storage elements accessible per access point X the element size/the data unit size (which may be the same as the size of data referenced by a mapping table entry).

Thus in the example shown in FIG. 1, N=4 as there are two planes×1 page per plane×8 kb per page=16 kb, which is then divided by the 4 kb data unit size to get to N=4. Using the N=4 example, if there are 2 staged data units and 11 data units in the new command, the controller can group and submit 3 requests of 4 data units each. At block 304, the remaining data unit(s) can be stored as a staged request. This is illustrated in the table below:

|  | Data Size | Unit No. |
| --- | --- | --- |
| Staged | 2 Units | Units No. 1-2 |
| New Command Received | 11 Units | Units No. 3-13 |
| Send Program Request 1 | 4 Units | Units No. 1-4 |
| Send Program Request 2 | 4 Units | Units No. 5-8 |
| Send Program Request 3 | 4 Units | Units No. 9-12 |
| Remainder (To be Staged) | 1 Unit | Unit No. 13 |

At block 305, a staged command timer may be reset, after which the process in one embodiment waits for the next command to be processed. If a new command arrives, the process in one embodiment returns to block 300. While waiting for the next command, the timer would increase (or decrease) toward an expiration threshold. As such, the staged command timer can be used to determine if a staged request has been pending for a period of time over a threshold without the arrival of a new command. If the threshold is reached (i.e., the timer expires), rather than delaying write of the staged data unit(s) to wait for combination with data from a subsequent write command, the staged data unit(s) can be submitted as a request at the expiration of the timer. Thus using the example in the table above, data unit no. 13 may be submitted in a program request to the array at the expiration of the timer.

In certain situations, where each command has a number of data units that is less than N, the staged request(s) may be combined cumulatively with data from later commands until the maximum size is reached, as illustrated by the following example:

|  | Data Size | Unit No. |
| --- | --- | --- |
| Command 1 (Staged) | 1 Unit | Units No. 1 |
| Command 2 (Staged) | 1 Unit | Units No. 2 |
| Command 3 (Staged) | 1 Unit | Units No. 3 |
| Command 4 (Staged) | 1 Unit | Units No. 4 |
| Send Program Request 1 | 4 Units | Units No. 1-4 |

Host Read Command Processing

A method of processing a read command according to an embodiment is shown in FIG. 4. This process can be performed, for example, by the controller 102 in FIG. 1. At block 400 a read command is received (e.g., a read command from the host). At block 401, the controller in one embodiment checks for any pending staged write requests. If there is no pending staged write request, the controller can proceed to process the read command at block 404. If there is a pending staged request, the controller determines whether the pending staged request overlaps in logical address with the new read command at block 402. If there is no overlap, a read request corresponding to the read command can be processed at block 404. If the read command overlaps, to ensure data coherency, the staged request is submitted to the NVM array at block 403, after which the read request corresponding to the read command can be processed at block 404.

Having staged data may negatively affect read performance since a write request needs to take place first before read request on the same data can be fulfilled. As an alternative to block 403, rather than submitting the staged request to force the programming of the staged data in the array, the data in the staged request could be used to fulfill the read command by returning the staged data rather than reading from the NVM array after writing the staged data. In this alternative, the staged request may not need to be accelerated for writing to the NVM array. As a result, an increased delay may be implemented on a staged request timer to increase the likelihood that staged data can be combined with later arriving write data.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 2-4 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile memory storage device, comprising:
a non-volatile memory array; and
a controller configured to:
maintain a logical-to-physical address mapping table, each entry in the mapping table referencing data having a first size;
receive a first write command from a host system, the first write command including write data;
divide the write data into one or more data units corresponding to the first size;
if it is determined that the one or more data units can be grouped into a data block of a second size different from the first size:
group a first subset of the one or more data units into the data block of the second size, the second size corresponding to a maximum number of data units that can be simultaneously programmed in a single program operation in the non-volatile memory array; program the first subset of data units in the non-volatile memory array; and
delay programming, for a duration that does not exceed a duration threshold, a second subset of the one or more data units that are not grouped with the first subset of data units for possible grouping with one or more data units from a second write command received subsequent to the first write command, wherein the write data comprises the first and second subsets of the one or more data units, and wherein the controller is further configured to increase the duration threshold based at least in part on a likelihood that at least one data unit of the second subset will be grouped with the one or more data units of the second write command; and
if it is determined that the one or more data units cannot be grouped into the data block of the second size at least in part because there are no pending data units for possible grouping with the one or more data units:
program the one or more data units in the non-volatile memory array,
wherein a size of the one or more data units is smaller than the second size.

2. The non-volatile memory storage device of claim 1 further comprising a volatile memory, wherein the controller is further configured to:
store in the volatile memory at least one data unit of the second subset of data units for possible grouping with one or more data units from the second write command.

3. The non-volatile memory storage device of claim 1, wherein the controller is further configured to program, after elapse of a period of time that equals to or exceeds the duration threshold, at least one data unit from the second subset of a size smaller than the second size without grouping the at least one data unit with one or more data units from the second write command.

4. The non-volatile memory storage device of claim 1, wherein the controller is further configured to group at least one data unit from the second subset with at least one data unit associated with the second write command for programming in the non-volatile memory array simultaneously using a single program operation.

5. The non-volatile memory storage device of claim 1, wherein the controller is further configured to:
receive a read command,
determine whether a logical address referenced by the read command overlaps any logical address corresponding to at least one data unit from the second subset, and
if there is an overlap, perform at least one of: delay execution of the read command until the at least one data unit from the second subset has been written to the non-volatile memory array and return the at least one data unit to satisfy the read command.

6. The non-volatile memory storage device of claim 1, wherein the controller is further configured to:
if the number of data units from the first command is less than the maximum number, combine the data units with data units from at least one other command so that the combined number of data units reaches the maximum number.

7. The non-volatile memory storage device of claim 1, wherein the controller is further configured to:
receive a read command,
determine whether a logical address referenced by the read command overlaps any logical address corresponding to at least one data unit from the second subset, and
if there is an overlap, return the at least one data unit to satisfy the read command.

8. The non-volatile memory storage device of claim 1, wherein the non-volatile memory array comprises a plurality of access points configured for simultaneous communications, each access point providing access to one or more storage elements, each storage element being of an element size.

9. The non-volatile memory storage device of claim 8, wherein the maximum number is the number of access points that can be accessed simultaneously multiplied by (1) the number of storage elements accessible per access point and (2) the element size and divided by (3) the first size.

10. The non-volatile memory storage device of claim 8, wherein each element comprises a page.

11. The non-volatile memory storage device of claim 10, wherein each access point comprises a plane on a die.

12. A method of managing submission of write requests to a non-volatile memory array in a non-volatile memory storage device, the method comprising:
   maintaining a logical-to-physical address mapping table, each entry in the mapping table referencing data having a first size;
   receiving a first write command from a host system, the first write command including write data;
   dividing the write data into one or more data units corresponding to the first size;
   if it is determined that the one or more data units can be grouped into a data block of a second size different from the first size:
      grouping a first subset of the one or more data units into the data block of the second size, the second size corresponding to a maximum number of data units that can be simultaneously programmed in a single program operation in the non-volatile memory array;
      programming the first subset of data units in the non-volatile memory array;
      delaying programming, for a duration of time that does not exceed a duration threshold, a second subset of the one or more data units that are not grouped with the first subset of data units for possible grouping with one or more data units from a second write command received subsequent to the first write command, wherein the write data comprises the first and second subsets of the one or more data units; and
      increasing the duration threshold based at least in part on a likelihood that at least one data unit of the second subset will be grouped with the one or more data units of the second write command; and
   if it is determined that the one or more data units cannot be grouped into the data block of the second size at least in part because there are no pending data units for possible grouping with the one or more data units:
      programming the one or more data units in the non-volatile memory array,
   wherein a size of the one or more data units is smaller than the second size.

13. The method of claim 12, further comprising storing at least one data unit of the second subset of data units for possible grouping with one or more data units from the second write command.

14. The method of claim 12, further comprising:
   receiving a read command,
   determining whether a logical address referenced by the read command overlaps any logical address corresponding to the stored at least one data unit, and
   if there is an overlap, performing at least one of: delaying execution of the read command until at least one data unit from the second subset has been written to the non-volatile memory array and returning the at least one data unit to satisfy the read command.

15. The method of claim 12, further comprising:
   if the number of data units from the first command is less than the maximum number, combine the data units with data units from at least one other command so that the combined number of data units reaches the maximum number.

16. The method of claim 12, further comprising programming, after elapse of a period of time that equals to or exceeds the duration threshold, at least one data unit from the second subset of a size smaller than the second size without grouping the at least one data unit with one or more data units from the second write command.

17. The method of claim 12, further comprising grouping at least one data unit from the second subset of the one or more data units with at least one data unit associated with the second write command for programming in the non-volatile memory array simultaneously using a single program operation.

18. The method of claim 12, further comprising:
   receiving a read command,
   determining whether a logical address referenced by the read command overlaps any logical address corresponding to at least one data unit from the second subset, and
   if there is an overlap, returning the at least one data unit to satisfy the read command.

19. The method of claim 12, wherein the non-volatile memory array comprises a plurality of access points configured for simultaneous communications, each access point providing access to one or more storage elements, each storage element being of an element size.

20. The method of claim 19, wherein the maximum number is the number of access points that can be accessed simultaneously multiplied by (1) the number of storage elements accessible per access point and (2) the element size and divided by (3) the first size.

21. The method of claim 19, wherein each element comprises a page.

22. The method of claim 21, wherein each access point comprises a plane on a die.

* * * * *